L. E. EVANS.
AGRICULTURAL IMPLEMENT.
APPLICATION FILED JULY 25, 1917.
1,287,930.
Patented Dec. 17, 1918.
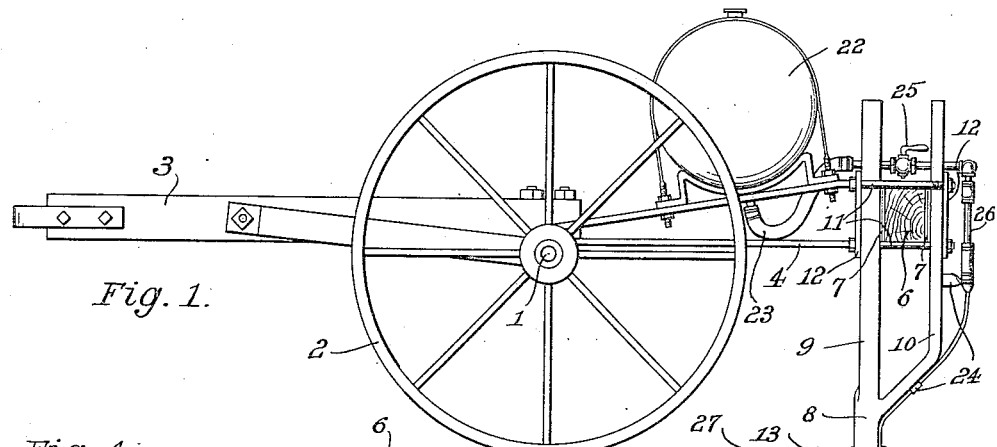
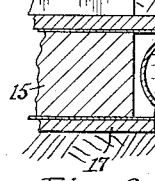
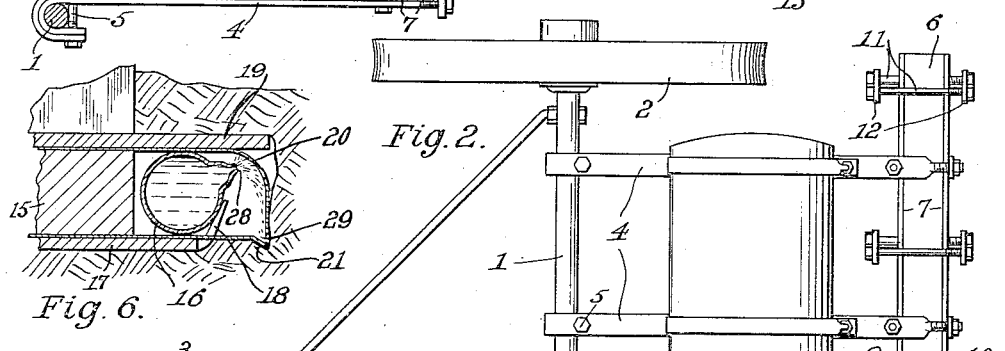
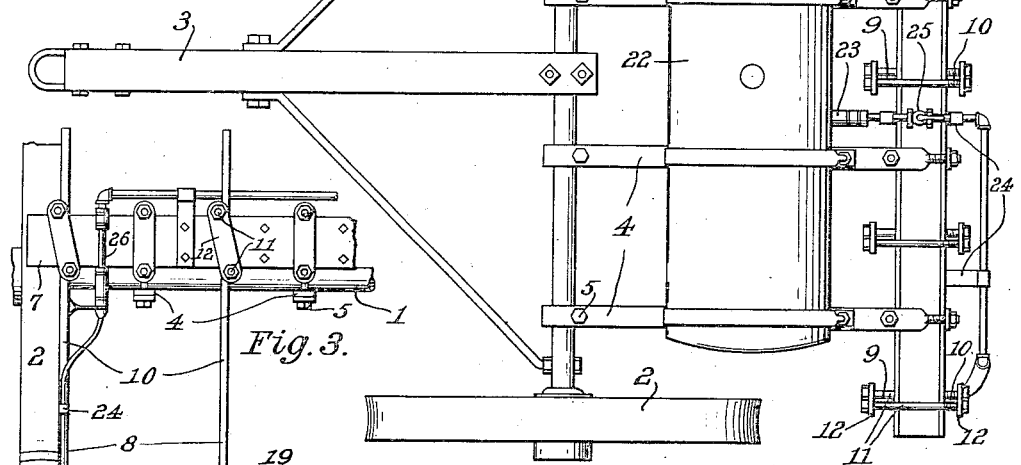
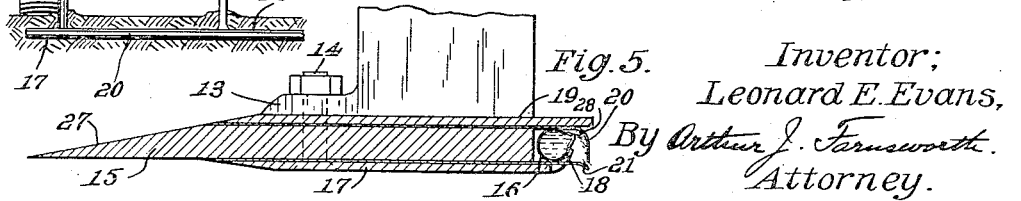
Inventor;
Leonard E. Evans,
By Arthur J. Farnsworth
Attorney.

UNITED STATES PATENT OFFICE.

LEONARD E. EVANS, OF OXNARD, CALIFORNIA.

AGRICULTURAL IMPLEMENT.

1,287,930.　　　　　Specification of Letters Patent.　　Patented Dec. 17, 1918.

Application filed July 25, 1917.　Serial No. 182,668.

*To all whom it may concern:*

Be it known that I, LEONARD E. EVANS, a citizen of the United States, residing at Oxnard, in the county of Ventura and State of California, have invented a new and useful Agricultural Implement, of which the following is a specification.

This invention relates to implements designed for introducing chemicals into the ground; and has for its object to provide improved means for injecting liquids beneath the surface of the ground in the form of a film, whereby to destroy objectionable growth.

I attain the object of injecting weed killing liquid at any desired depth below the surface of the soil by means of the device illustrated in the accompanying drawing, in which—

Figure 1 is a side elevation, and Fig. 2 is a plan view of the complete machine; Fig. 3 is a fragmentary rear elevation of the same; Fig. 4 is a detail view in elevation of one of the elements of the machine by which the injection devices are attached to its axle; Fig. 5 is a vertical section on an enlarged scale, showing the construction of the injection means; and Fig. 6 is a fragmentary detail of these injection means on a still larger scale, to show how the liquid is sprayed and introduced into the soil.

Similar numerals refer to similar parts throughout the several views.

The axle 1 is mounted upon wheels 2 and is provided with a suitably braced tongue 3, by means of which the machine may be hauled over the ground to be treated. Wheels 2 are preferably provided with concaved tires, as shown in the drawing, in order to minimize side skidding due to inequalities in the character of the earth, or other causes. Mounted upon the axle at intervals are the structural yokes 4 for attaching the injection devices. These yokes are clamped to the axle at their forward ends by the bolts 5, and at the rear they embrace and clamp the follower beam 6 in the manner clearly indicated in the drawing.

Beam 6 is preferably provided with metal plates 7 at each side and to it at intervals, are clamped the yokes 8. The latter have integral upstanding parallel arms 9 and 10, embracing beam 6 and allowing of making a vertical adjustment of the position of the yokes with respect to the beam. Arms 9 and 10 are firmly clamped to beam 6 by bolts 11 and plates 12.

At their lower ends yokes 8 are provided with forwardly projecting lugs 13 to which the injection apparatus is attached by bolts 14. In the drawing these lugs 13 are shown as having a horizontal under surface, but they may be made, if preferred, with an inclined under surface for giving greater angularity to the knife.

The injection apparatus comprises a horizontal knife 15 of considerable thickness and, preferably, extending the full width of the machine; a horizontal spray pipe 16 of a diameter not greater than the thickness of the knife and secured in place immediately behind it; a lower cover plate 17 having upstanding fingers 18 at intervals, for holding the spray pipe in place; a top cover plate 19 for protecting the spray pipe and maintaining it in position; and upper and lower spray plates 20 and 21, respectively, for directing the liquid film into the ground. The lower spray plate is provided, near its rear edge, with spaced openings (not shown) through which the fingers 18 protrude.

Mounted upon yoke 4 in a suitable cradle and held in place by straps, is a chemical tank 22. This is connected by hose 23 to a pipe line leading to, and supplying, the spray pipe 16. The pipe line is supported at intervals by suitable clamps, as shown at 24. The flow of the liquid to the spray pipe is controlled by the cock 25, and at 26 a section of glass tubing is introduced into the pipe line for the purpose of enabling the operator to see the liquid, which is usually colored, and thereby to know that the machine is working properly. In the form of machine illustrated, this glass tube is held in place by inserting it at each end into short lengths of hose clamped to it and to the fittings of the pipe line.

In operation the machine is hauled over the ground to be treated by any suitable traction means, and the knife 15 is thus forced through the soil at a predetermined distance beneath its surface. Maintaining the knife beneath the surface of the ground is accomplished by adjusting the angle of its cutting edge. In the drawing the cutting edge has a horizontal lower surface and a downwardly inclined upper surface 27. The angle of surface 27, together with the combined weights of the devices attached to yokes 4, tends to force the knife into the ground and keep it there. On the other hand the resistance of the soil to the passage of the knife through it tends to raise the latter out of the soil. These opposing forces, acting upon the knife edge, will adjust themselves until they are in balance with the knife working at a certain distance beneath the surface of the ground. To alter this distance, either up or down, all that is required is an adjustment of the knife angle and it is evident from the drawing that this may be accomplished by varying the point at which the arms 9 and 10 are clamped to the beam 6.

Pipe 16 is provided, at the rear and above its center, with a plurality of specially shaped orifices 28 adapted in size and form to the liquid pressure to be employed. The function of these orifices is to spray the liquid issuing from them, so that a uniform thin film will be deposited upon the interior surface of plate 20. This film will then trickle down in the manner indicated in Fig. 6, and pass into the ground through the slit 29 formed between plates 20 and 21.

It will be evident that the spray pipe and spray orifices are completely protected at all times, and therefore they are not subject to clogging or interruption of service due to the entrance of the soil. It will also be evident, from a consideration of the drawing, that the film of liquid is covered the instant after it enters the ground. Hitherto these matters have been among the most common reasons for the failure of apparatus of this character.

The invention is not limited to the details of construction shown except as set forth in the appended claims.

I claim as my invention:

1. An agricultural implement comprising a wheeled frame; a horizontal knife attached thereto and arranged to travel beneath the surface of the ground; a spray pipe attached at the back of the knife so as to be protected in its motion through the ground thereby; an elevated tank connected to the pipe with a valve and a visual flow indicator interposed; and plates for directing the discharge from the pipe downwardly into the ground.

2. An agricultural implement comprising a wheeled frame; a knife attached thereto and arranged to travel through the ground; a spray pipe attached at the back of the knife so as to be protected thereby; a tank connected to the pipe with a valve and a flow indicator interposed; and plates for directing the discharge from the pipe into the ground.

LEONARD E. EVANS.